(12) United States Patent
Guemmer

(10) Patent No.: US 9,822,645 B2
(45) Date of Patent: Nov. 21, 2017

(54) GROUP OF BLADE ROWS

(71) Applicant: Rolls-Royce Deutschland Ltd & Co KG, Blankenfelde-Mahlow (DE)

(72) Inventor: Volker Guemmer, Mahlow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 342 days.

(21) Appl. No.: 14/626,565

(22) Filed: Feb. 19, 2015

(65) Prior Publication Data

US 2015/0240648 A1  Aug. 27, 2015

(30) Foreign Application Priority Data

Feb. 27, 2014  (DE) .................... 10 2014 203 605

(51) Int. Cl.
  *F01D 5/14*  (2006.01)
  *F01D 5/20*  (2006.01)
  (Continued)

(52) U.S. Cl.
  CPC ............. *F01D 5/145* (2013.01); *F01D 5/022* (2013.01); *F01D 5/142* (2013.01); *F01D 5/143* (2013.01);
  (Continued)

(58) Field of Classification Search
  CPC .......... F01D 5/145; F01D 5/142; F01D 5/143; F01D 5/146; F01D 9/041; F04D 29/324;
  (Continued)

(56) References Cited

U.S. PATENT DOCUMENTS

| 7,946,825 B2 * | 5/2011 | Tudor .................. F04D 29/384 416/223 A |
| 8,534,997 B2 | 9/2013 | Guemmer |

(Continued)

FOREIGN PATENT DOCUMENTS

| DE | 102009033593 | 1/2011 |
| DE | 102010053798 | 6/2012 |

(Continued)

OTHER PUBLICATIONS

European Search Report dated Oct. 26, 2015 from counterpart European App No. 15156107.3.

(Continued)

*Primary Examiner* — Woody Lee, Jr.
*Assistant Examiner* — Eric Zamora Alvarez
(74) *Attorney, Agent, or Firm* — Shuttleworth & Ingersoll, PLC; Timothy Klima

(57) ABSTRACT

The present invention relates to a blade row group arrangeable in a main flow path of a fluid-flow machine and including N adjacent member blade rows firmly arranged relative to one another in both the meridional direction and the circumferential direction, with the number N of the member blade rows being greater than/equal to 2 and (i) designating the running index with values between 1 and N, with a front member blade row (i) as well as a rear member blade row (i+1) being provided, and with the blade row group having two main flow path boundaries. It is provided that there is a gap between one blade end of at least one blade of at least one of the member blade rows and at least one of the two main flow path boundaries.

17 Claims, 11 Drawing Sheets

(51) Int. Cl.
  *F04D 29/32* (2006.01)
  *F04D 29/54* (2006.01)
  *F01D 9/04* (2006.01)
  *F01D 5/02* (2006.01)

(52) U.S. Cl.
  CPC ............ *F01D 5/146* (2013.01); *F01D 5/20* (2013.01); *F01D 9/04* (2013.01); *F01D 9/041* (2013.01); *F04D 29/324* (2013.01); *F04D 29/542* (2013.01); *F04D 29/544* (2013.01); *F05D 2240/125* (2013.01); *F05D 2240/24* (2013.01); *F05D 2240/307* (2013.01); *Y02T 50/673* (2013.01)

(58) Field of Classification Search
  CPC ............ F04D 29/542; F04D 29/544; F05D 2240/125; F05D 2240/24; F05D 2240/307; F05D 2240/11
  See application file for complete search history.

(56) References Cited

U.S. PATENT DOCUMENTS

| | | | | |
|---|---|---|---|---|
| 8,568,095 | B2* | 10/2013 | Bushnell | F04D 29/164 415/228 |
| 8,573,941 | B2* | 11/2013 | Hoeger | F01D 5/142 415/181 |
| 2004/0223844 | A1 | 11/2004 | Farrell et al. | |
| 2008/0298974 | A1 | 12/2008 | Guemmer | |
| 2009/0238682 | A1 | 9/2009 | Clemen | |
| 2010/0143105 | A1 | 6/2010 | Goto et al. | |
| 2010/0303629 | A1* | 12/2010 | Guemmer | F01D 5/146 416/223 R |
| 2011/0014057 | A1 | 1/2011 | Guemmer | |
| 2011/0150643 | A1 | 6/2011 | Wery et al. | |
| 2011/0311355 | A1 | 12/2011 | Benkler et al. | |
| 2012/0148396 | A1 | 6/2012 | Guemmer | |
| 2013/0209223 | A1 | 8/2013 | Gomez et al. | |
| 2013/0209241 | A1* | 8/2013 | Gomez | F01D 9/00 415/185 |

FOREIGN PATENT DOCUMENTS

| | | |
|---|---|---|
| EP | 1998049 A2 | 12/2008 |
| EP | 2 261 463 | 12/2010 |

OTHER PUBLICATIONS

German Search Reported dated Mar. 31, 2014 from counterpart German App No. 10 2014 203 605.4.

* cited by examiner

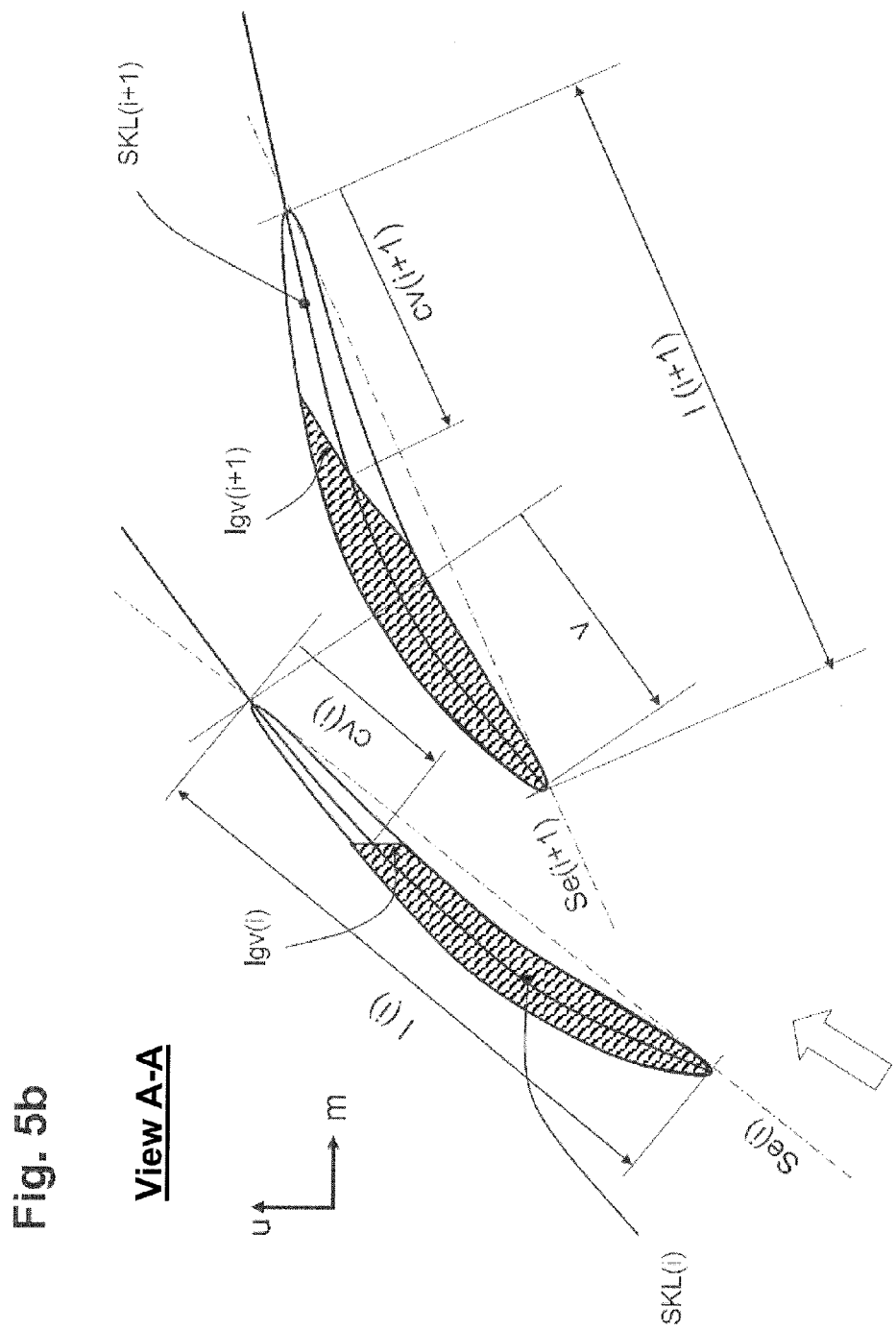

View A-A

GROUP OF BLADE ROWS

CROSS-REFERENCE TO RELATED APPLICATION

This application claims priority to German Patent Application No. 10 2014 203 605.4 filed on Feb. 27, 2014, the entirety of which is incorporated by reference herein.

BACKGROUND

This invention relates to a blade row group.

The aerodynamic loadability and the efficiency of fluid-flow machines, in particular blowers, compressors, turbines, pumps and fans, is limited by the growth and the separation of boundary layers near and on the hub and casing walls. To remedy this problem in the case of high aerodynamic loading and important boundary layer growth on the annulus duct side walls (hub or casing), the state of the art provides solutions only to a limited extent.

State of the art in fluid-flow machines are arrangements with double-row stator wheels, usually employed as exit stator wheels in compressors, or also double-row rotor arrangements in which directly adjacent rotors operate counter-rotatingly, or in which two directly adjacent rotor blade rows are attached to a common drum. A fluid-flow machine of this type is known for example from EP 2 261 463 A2. With these arrangements, and in particular with those having several, directly adjacent blade rows firmly arranged relative to one another (for example several rotor blade rows on the same drum, or several stator vane rows), severe boundary layer separation occurs at higher aerodynamic loading in the boundary zone of the main flow path, i.e. at the hub or casing contour.

The state of the art also includes double-row adjustable stator wheels, the vanes of which at the hub and at the casing are arranged on a rotary base to allow them to be turned in the angle of attack. Due to size restrictions it is usual here to provide a partial radial gap for the rotary base in the circumferential direction, said gap being located along a rear part of the rear profile.

The problems in the edge areas are primarily due to the fact that the favourable arrangement of two adjacent blade edges of a blade row group in the center of the main flow path has an unfavourable effect in the vicinity of the flow path boundary. The required flow deflection may quickly be so high either in parts of the blade height or along the entire blade height that the conventional arrangement leads to very premature separation of the boundary layer flow in the edge areas of the main flow path on the hub and/or the casing walls.

SUMMARY

An object underlying the present invention is to provide a blade row group that achieves a favourable flow behaviour also in the edge areas of the main flow path.

It is a particular object of the present invention to provide solution to the above problem by a blade row group having the features as described herein.

Accordingly, the solution in accordance with the invention provides a blade row group consisting of at least two adjacent blade rows firmly arranged relative to one another (possibly several co-rotating rotor blade rows or several stator vane rows), with a gap being provided between one blade end of at least one blade of at least one of the blade rows of the blade row group and at least one of the two main flow path boundaries (hub and casing). The blade in question and the main flow path boundary in question are arranged fixed and immovable relative to one another here, said gap extending along at least part of the profile depth of the blade in question along the main flow path boundary. As a result, fluid can pass from the substantially concave blade pressure side to the substantially convex blade suction side of the blade in order to achieve an effect on the flow in the area of the main flow path boundary.

The invention is therefore based on the knowledge that by providing a gap between a blade and a main flow path boundary on which the blade is firmly arranged, an improved flow behaviour is obtained in this edge area of the main flow path.

A main flow path boundary is formed radially on the inside for example by a hub contour and radially on the outside for example by a casing contour, e.g. by a wall or a stator root or a stator shroud or a rotor root or a rotor shroud or a blade rotary base.

Further embodiments can be provided as follows:

According to a further embodiment, a gap or partial gap is provided at the same main flow path boundary both on the front member blade row (i) and on the rear member blade row (i+1).

It can also be provided that a partial gap is formed at the same main flow path boundary both on the front member blade row (i) and on the rear member blade row (i+1).

It can furthermore be provided that on the front member blade row (i), a gap (referred to as partial gap) extending over a partial section of the profile depth is provided at a main flow path boundary, with the rear member blade row (H−1) at the same main flow path boundary not having a gap.

A further embodiment provides that there is a partial gap in the center area of the profile depth, where the profile section face is divided in two by the profile end face, where the profile end face is delimited by the front limit line lgv and the rear limit line lgh, where the depth of indent ch is measured from the trailing edge to the intersection point of the skeleton line SKL with the rear limit line lgh in the direction of the profile chord Se, and where the following relationship applies for the depth of indent ch:

$$0.15 < (cv-ch)/l < 0.55$$

A partial gap can be provided here in the center area of the profile depth of the front member blade row (i), where the following relationship applies for the depth of indent ch(i):

$$0.15 < (cv(i)-ch(i))/l(i) < 0.55$$

According to a further embodiment, a partial gap is formed on at least one of the member blade rows (i) and (i+1), where the skeleton line SKL and the limit line lgv intersect at point S, where the tangent t_skl on the skeleton line and the tangent t_lgv on the front limit line are provided at point S, where the angle of inclination alpha from the tangent t_skl in the mathematically positive sense of rotation to the tangent t_lgv is defined as a dimension for the alignment of the front limit line relative to the main flow direction, and where values of the angle of inclination are provided in the range of 20°<alpha<70°. In particular, values of the angle of inclination can be provided in the range of 35°<alpha<55°.

An embodiment of the invention provides that in the area of a partial gap, there is a flat or curved section B-B through the blade profile of one of the member blade rows (i) and (i+1), where this section is oriented perpendicular to a u-m plane extending at an infinitesimally small distance from the main flow path boundary and passing through the partial gap, where the suction side point Pss is provided in the section B-B at the corner formed by the blade suction side and the profile end face, where the effective gap width e is provided between the suction side point Pss and the main flow path boundary HB, and where the effective gap width e increases along at least a partial area of the profile depth in the direction of the profile trailing edge.

The present invention relates to blades of fluid-flow machines, such as blowers, compressors, pumps, fans and turbines of the axial, semi-axial and radial type using gaseous or liquid working medium. The fluid-flow machine may include one or several stages, each stage having a rotor and a stator, in individual cases, the stage is formed by a rotor only. The rotor includes a row of blades or several adjacent blade rows forming a group, which are connected to the rotating shaft of the machine and exchange energy with the working medium. An application in fluid-flow machines where the rotor transfers energy to the working medium is favourable in accordance with the invention. The rotor may be provided with shroud or running gap at the outer blade end. The stator includes a row of stationary vanes or several adjacent vane rows forming a group, which may either feature a fixed or a free vane end with gap on the hub and on the casing side.

Rotor drum and blading are usually enclosed by a casing, in other cases (e.g. aircraft or ship propellers) no such casing exists. The machine may also feature a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from the outside of the annulus duct. In an alternative configuration, multi-stage types of said fluid-flow machine may have two counter-rotating shafts, with the direction of rotation of the rotor blade rows alternating between stages. Here, no stators exist between subsequent rotors. Finally, the fluid-flow machine may—alternatively—feature a bypass configuration such that the single-flow annulus duct divides into two concentric annuli behind a certain blade row, with each of these annuli housing at least one further blade row.

BRIEF DESCRIPTION OF THE DRAWINGS

The present invention is more fully described in the following with reference to the figures of the accompanying drawing showing several exemplary embodiments.

FIG. 5b shows definitions in accordance with the present invention on an edge-near blade flow line section in view A-A from FIG. 5a.

DETAILED DESCRIPTION

Figure 1:
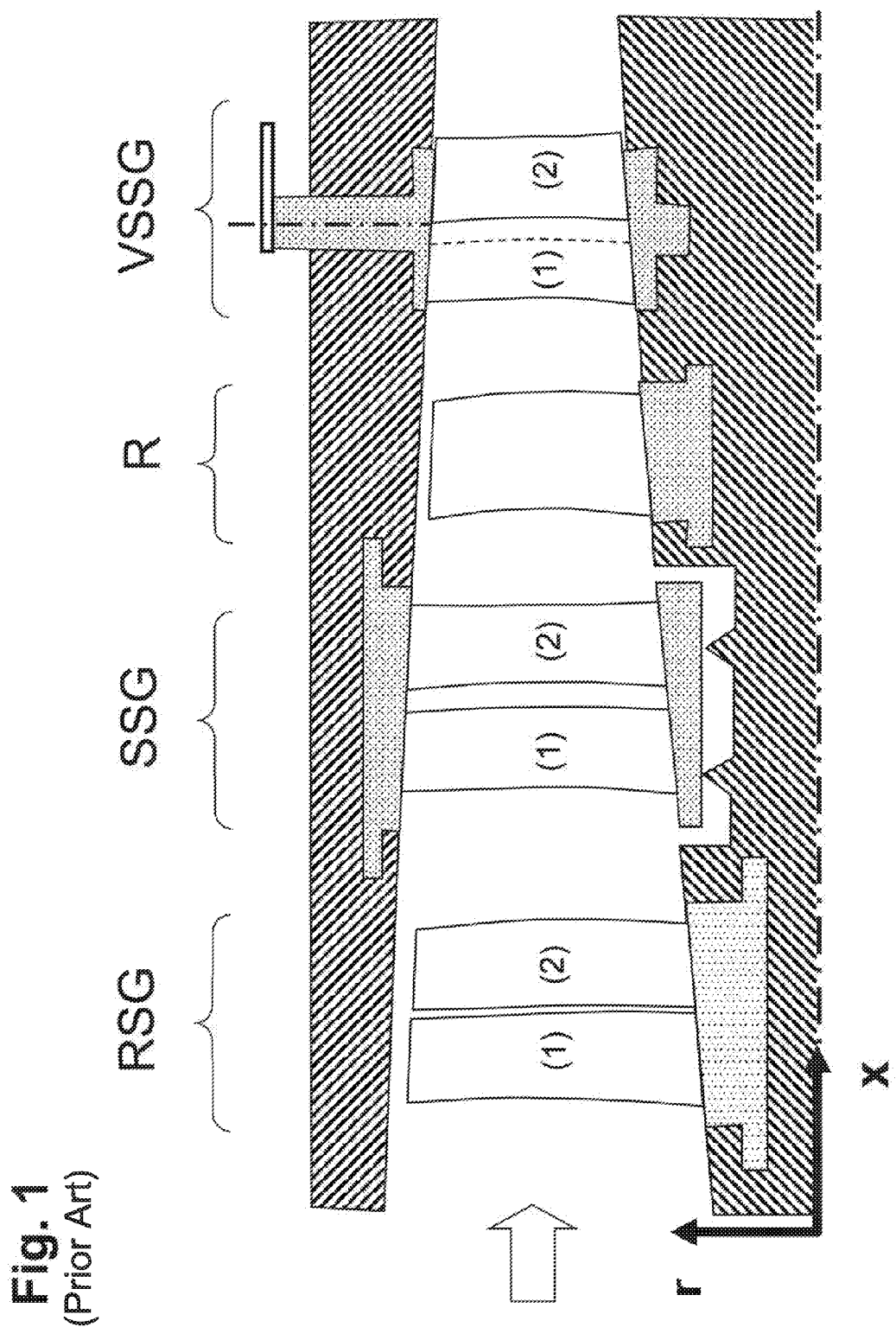
FIG. 1 shows several blade row groups in accordance with the state of the art.

A conventional blade row group according to the state of the art, as shown in FIG. 1, has, if there is no relative movement between the ends of the blades provided and the main flow path boundary HB, no gap between the blade end and the main flow path boundary. By contrast, rotor blade row groups without shroud usually have running gaps at their outer ends. In the same way, stator vane row groups without inner shroud usually have running gaps at their inner ends.

FIG. 1 shows, in the meridional plane established by the axial direction x and the radial direction r, several blade row groups, with each of the blade row groups including two similar member blade rows showing no variation in their relative arrangement to one another (both circumferentially and meridionally). This relates therefore to double-row stator wheels or rotor wheels.

Accordingly, a rotor blade row group RSG includes two rotor blade rows with a running gap at the casing, the rotor blade rows rotating at the same speed and being connected to each other; the first member of the group is marked (1) and the second member of the group is marked (2).

A stator vane row group SSG includes two directly adjacent stationary stator vane rows (1) and (2).

The variable stator vane row group VSSG includes two directly adjacent stator vane rows (1) and (2), with one vane of the front row and one vane of the rear row being each provided on a common rotary base and thus jointly settable about the rotary axis.

Figure 2A:
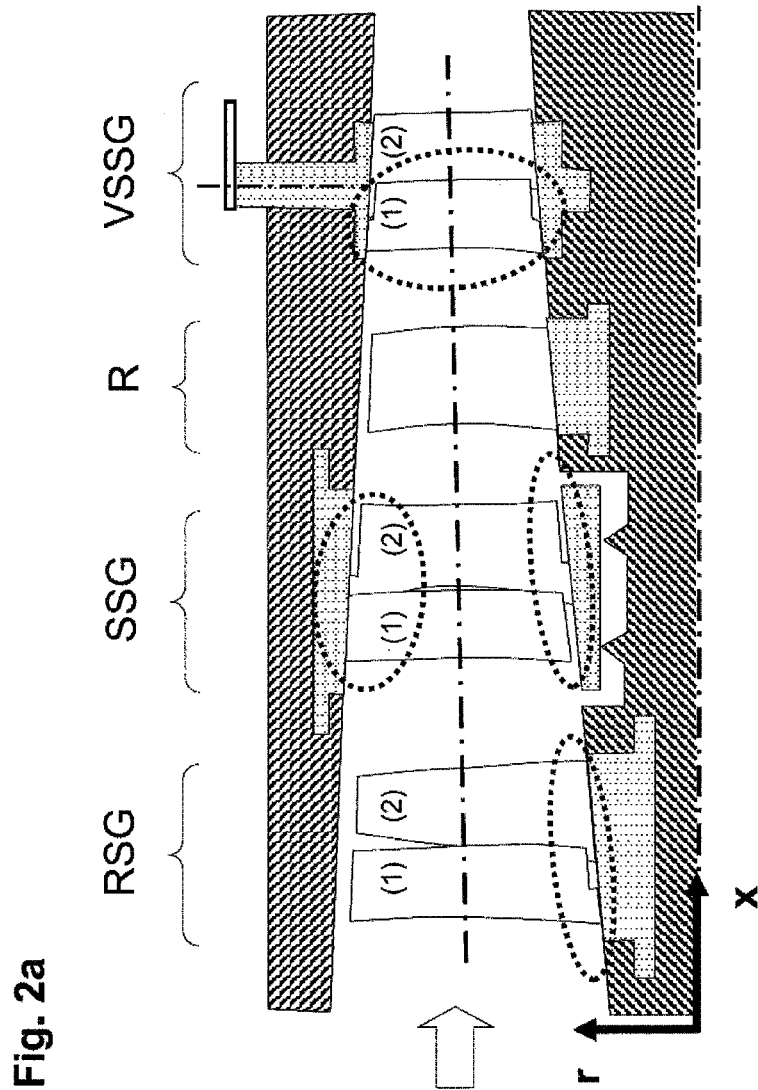
FIG. 2a shows a summary of several blade row groups in accordance with the present invention.

FIG. 2a shows, in the meridional plane established by the axial direction x and the radial direction r, several blade row groups in accordance with the present invention, with each of the blade row groups including two similar member blade rows showing no variation in their relative position to one another.

Accordingly, a rotor blade row group RSG according to the present invention includes at least two rotor blade rows (1) and (2) rotating at the same speed and being connected to each other. The front blade row member (1) has a partial gap on the root of the rotor in accordance with the present invention.

A stator vane row group SSG in accordance with the present invention includes two directly adjacent stationary stator vane rows (1) and (2). The front vane row member has a gap at the stator hub in accordance with the present invention, the rear vane row member has a partial gap at the hub and at the casing in accordance with the present invention.

A variable stator vane row group VSSG according to the present invention includes two directly adjacent stator vane rows (1) and (2). A vane of one of the member vane rows, together with at least one vane of its immediately downstream member vane row, is here provided on a common rotary base. Alternatively, as not illustrated herein, at least two vanes appertaining to different member vane rows can also be arranged on an individual rotary base each. The front vane row member has a partial gap at the hub and at the casing in accordance with the present invention.

Figure 2B:
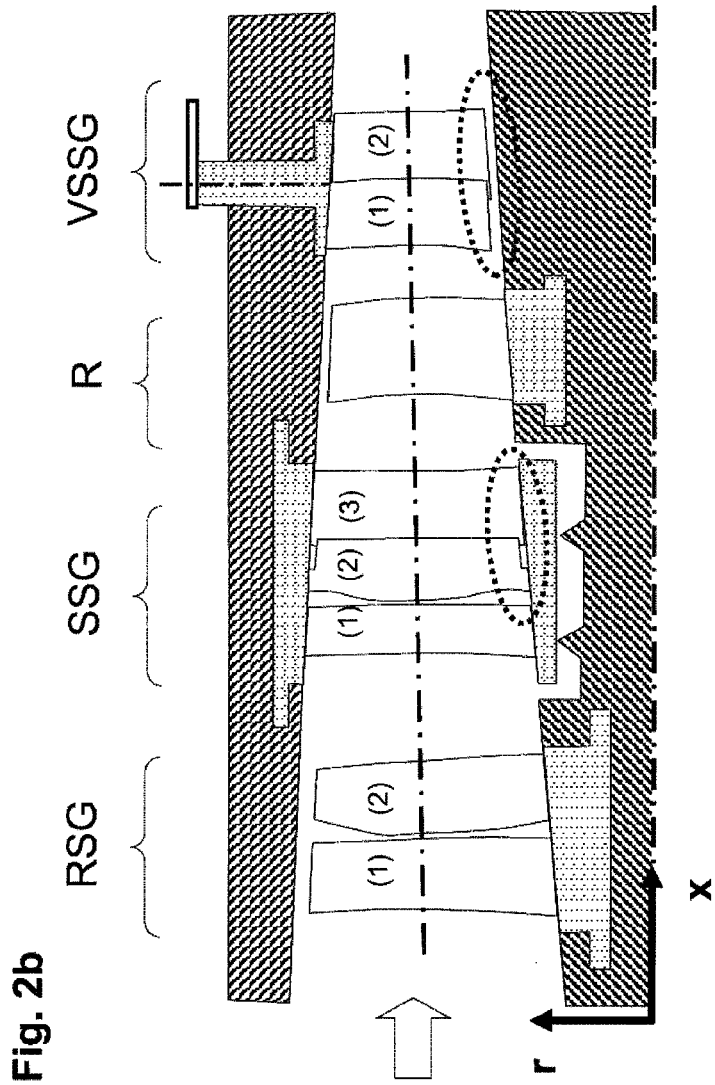
FIG. 2b shows a summary of further blade row groups in accordance with the present invention.

As shown in FIG. 2b, the blade row group in accordance with the present invention can also have more than two member blade rows, as exemplified here for a number of 3 on the stator vane row group SSG.

As not explicitly shown here, a rotor blade row group RSG or a variable stator vane row group can also be provided with more than 2 member blade rows.

The described configuration of the blade row group includes the possibility that on at least one member blade row the distance between two adjacent blades varies along the circumference. It may also be favourable if the axial position of two adjacent blades of this blade row varies along the circumference. It may also be favourable if the profile depth of two adjacent blades of this blade row varies along the circumference.

It may further be advantageous if the numbers of blades of two adjacent member blade rows are in a special ratio to each other, i.e. the number of blades of the member blade row (i) is a multiple of the number of blades of the member blade row (i+1), or the number of blades of the member blade row (i+1) is a multiple of the number of blades of the member blade row (i), or the number of blades of the member blade row (i) equals the number of blades of the member blade row (i+1).

Figure 3:
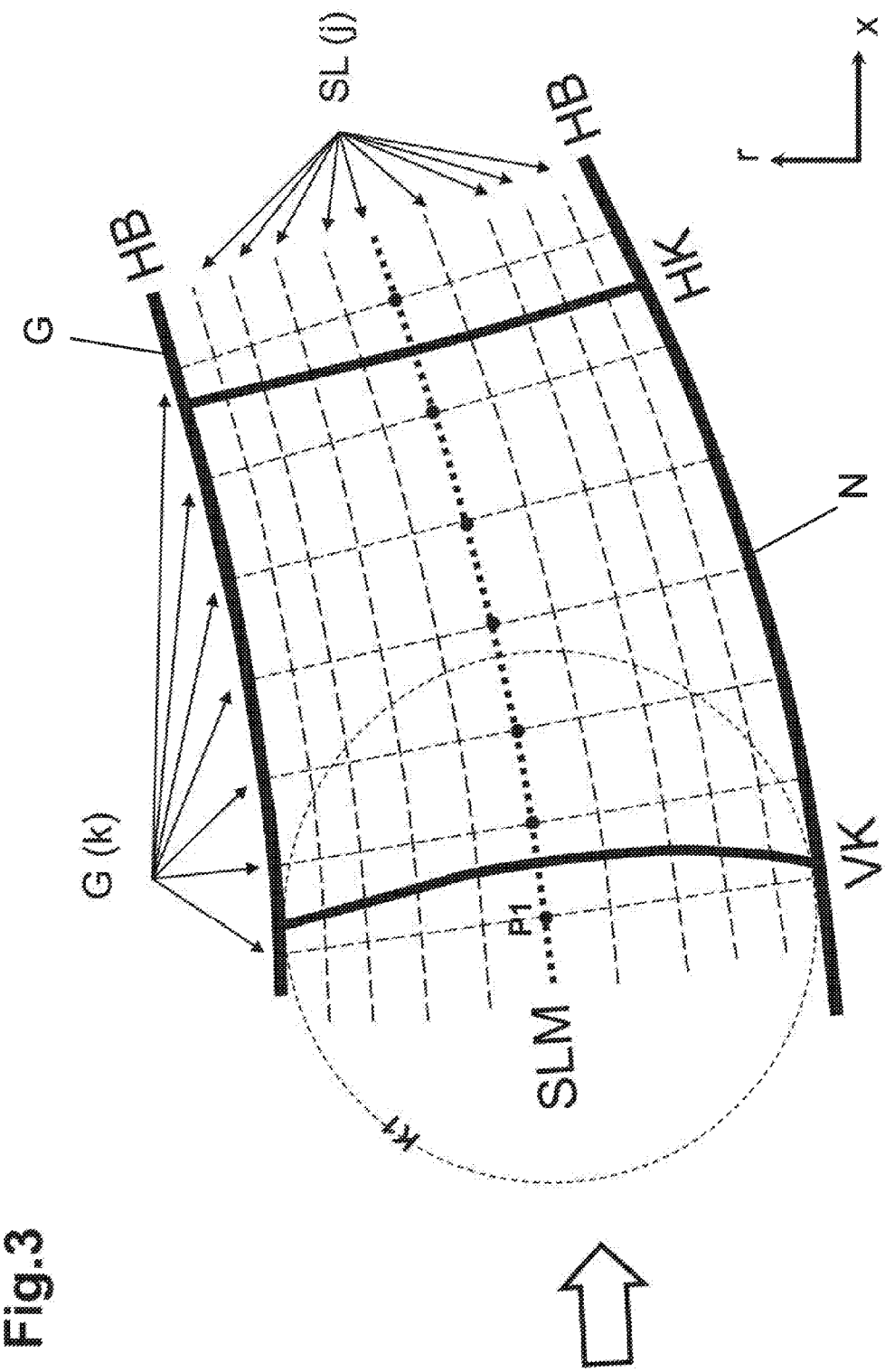
FIG. 3 shows the definition of meridional flow lines.

FIG. 3 shows, for the definition of meridional flow lines, a main flow path of a fluid-flow machine with through-flow from left to right (indicated by the bold arrow), in the meridional plane established by the axial coordinate x and the radial coordinate r, where the main flow path is delimited by the radially inner main flow path boundary N and by the radially outer main flow path boundary G. The mean meridional flow line SLM is in the center between the radially inner main flow path boundary N and the radially outer main flow path boundary G. Its course matches the connection of the center points of circles inscribed in the main flow path, as is made clear by the example in the illustration for the first marked point P1 on the mean meridional flow line SLM and the appertaining circle K1. VK and HK indicate the leading edge and the trailing edge of a blade arranged in the main flow path.

There is a family of straight lines G(k) inside the main flow path whose members are each perpendicular to the mean meridional flow line SLM and end at the main flow path boundaries HB. Further meridional flow lines SL(j) are defined by the connection of points with an identical percentage subdivision of the straight lines G(k) between the main flow path boundaries HB in each case. The rotation of a meridional flow line about the machine axis results in a meridional flow surface. The intersection of a meridional flow surface with a blade of the fluid-flow machine results in a meridional flow line section.

The main flow path boundary HB represents in accordance with the invention a contour at the hub or at the casing of the fluid-flow machine, for example on a rotary base, a wall, a stator root, a stator shroud, a rotor root or a rotor shroud.

The invention provides that the main flow path boundary HB does not move relative to the blade row group when viewed in the circumferential direction of the fluid-flow machine, and that a gap is provided along the main flow path boundary between at least one blade end and the main flow path boundary at least along part of the profile depth of the blade in question, through which gap fluid passes from the blade pressure side to the blade suction side.

In individual blade rows with a usual degree of flow deflection achieved in conventional designs, experience shows that the provision of edge gaps leads to additional total pressure losses in the area of the main flow path boundaries, reducing the performance values of a machine. In blade row groups in accordance with the present invention, by contrast, disproportionately high total pressure losses per se occur due to the particularly heavy aerodynamic loading and the resultant stagnation of the wall boundary layers inside the blade passage, which can only be reduced by an additional effect provided by the overflow of fluid through the gap in accordance with the invention along the main flow path boundary. The sketch in FIG. 4 shows this by way of example for a configuration with partial gaps.

Figure 4:
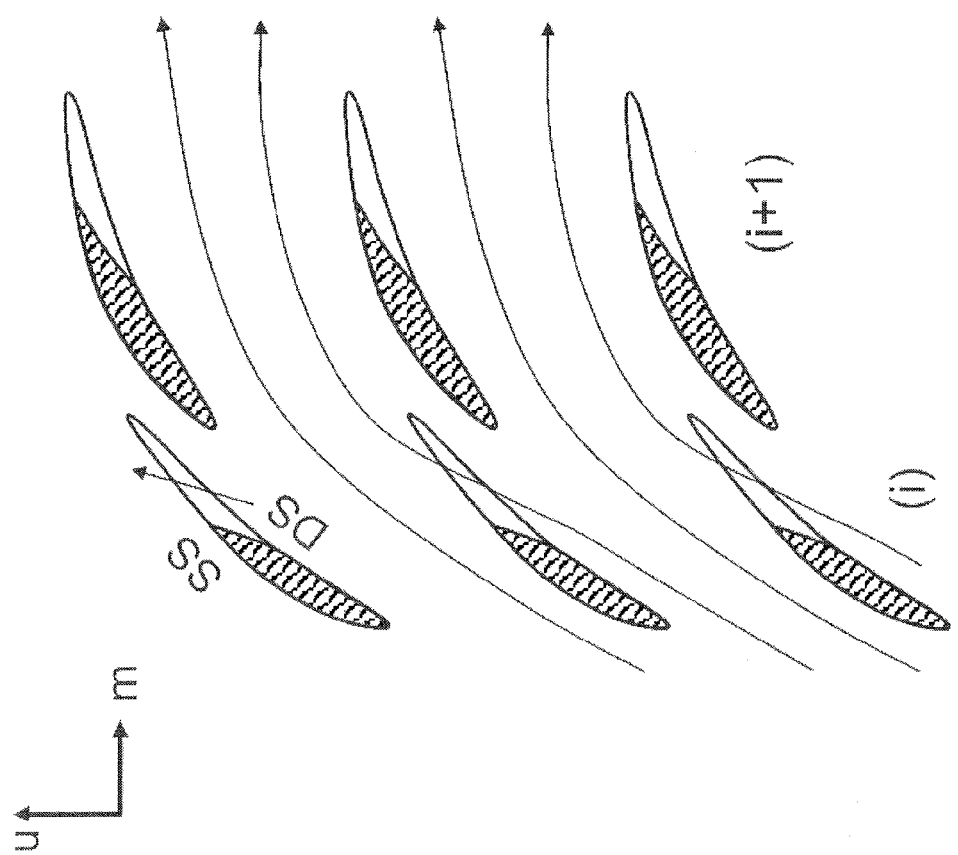
FIG. 4 shows a schematic sketch of the flow close to the wall with and without radial gap in accordance with the present invention.
Figure 4:
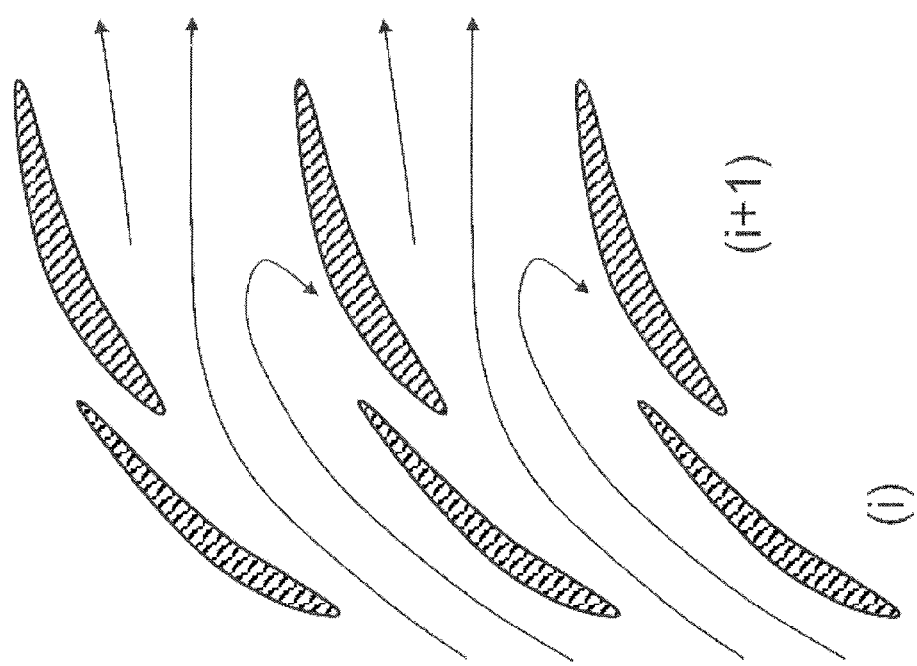

FIG. 4 therefore shows on its right-hand side the flow close to the wall with edge gap. It can be discerned that the flow passes through the edge gaps from the substantially concave pressure side DS to the substantially convex suction side SS of the blades.

Figure 5A:
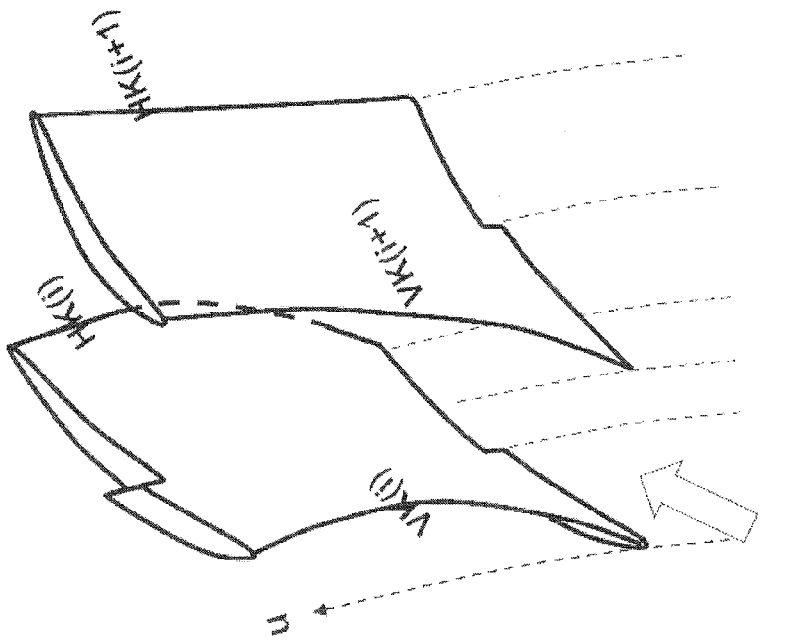
FIG. 5a shows an inventive arrangement of two blade group members (i) and (i+1) with the partial gap being flush with the trailing edge.
Figure 5A:
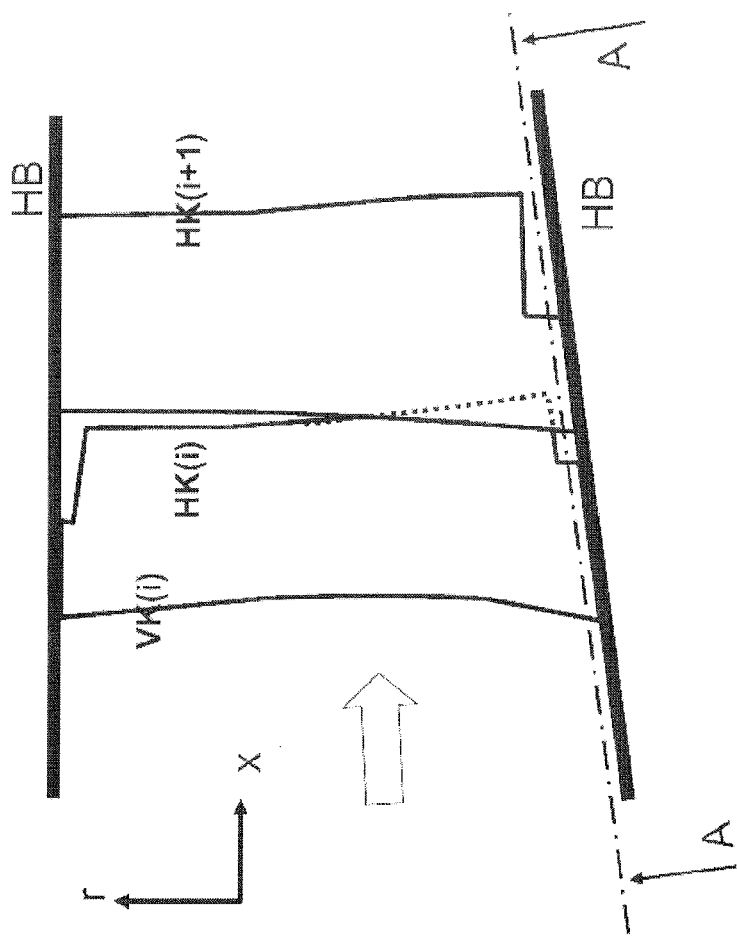
Figure 6A:
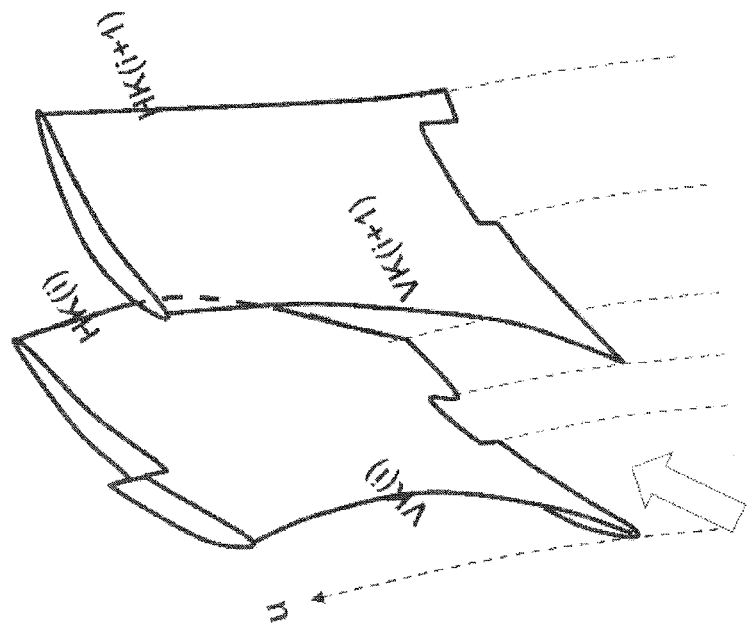
FIG. 6a shows an inventive arrangement of two blade group members (i) and (i+1) with a partial gap provided in the center area of the profile depth.
Figure 6A:
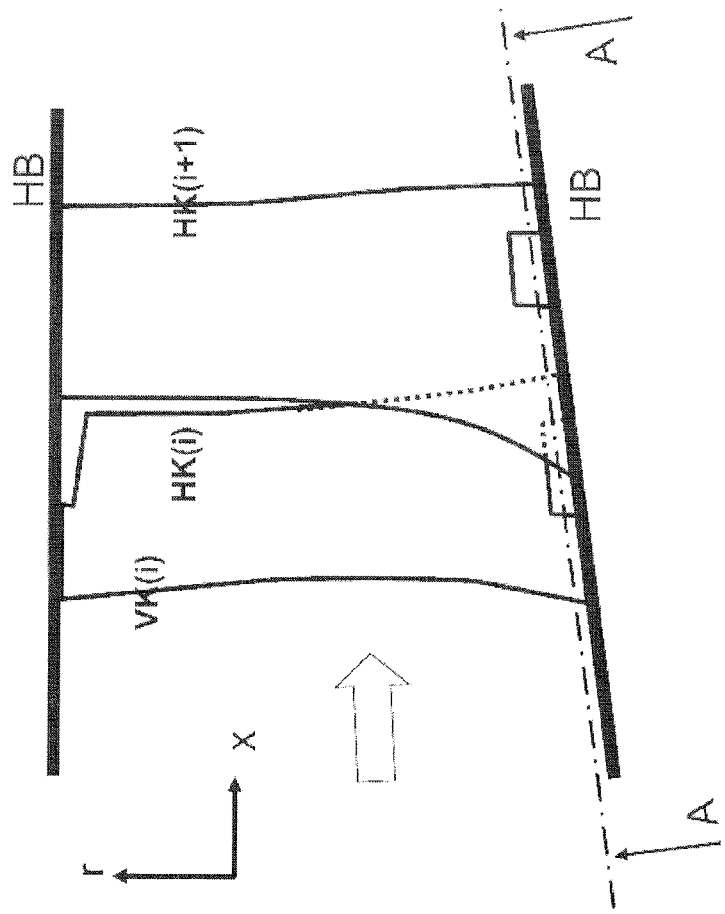

FIG. 5a and FIG. 6a show on the left-hand side two adjacent member blade rows (i) and (i+1), appertaining to a blade row group in accordance with the invention, in the meridional plane established by the axial direction x and the radial direction r and shown between the main flow path boundaries HB, hub and casing. The right-hand side of the figure shows a corresponding spatial illustration of the blade configuration, with the dashed lines extending in the circumferential direction u of the machine. The main inflow direction is identified by a bold arrow. The blade row group in accordance with the invention can include overall more than the two member blade rows shown in each case.

The arrangement in accordance with the invention of two adjacent member blade rows (i) and (H+1) in the area between the two main flow path boundaries HB delimiting said rows is shown. The member blade rows (i) and (H+1) each have a leading edge VK and a trailing edge HK.

It can be advantageous when a gap extending over the entire profile depth is provided on the front member blade row (i) on at least one of its blade ends between the blade and the main flow path boundary. This solution is not explicitly shown in FIG. 4.

Alternatively it can be advantageous when a gap extending over a partial section of the profile depth, also referred to as a partial gap, is provided on the front member blade row (i) on at least one of its blade ends between the blade and the main flow path boundary. It can be particularly advantageous here when the partial gap is provided inside the center profile area and does not touch any of the leading and trailing edges, as shown in FIG. 6a.

It can also be particularly advantageous when the partial gap is provided inside a partial area of the profile depth extending up to the trailing edge, as shown in FIG. 5a.

It can further be advantageous when a gap extending over the entire profile depth is provided on the rear member blade row (i+1) on at least one of its blade ends between the blade and the main flow path boundary. This solution is not explicitly shown in FIG. 4.

Alternatively it can be advantageous when a gap extending over a partial section of the profile depth, also referred to as a partial gap, is provided on the rear member blade row (i+1) on at least one of its blade ends between the blade and the main flow path boundary. It can be particularly advantageous here when the partial gap is provided inside the center profile area and does not touch any of the leading and trailing edges, as shown in FIG. 6a.

It can also be particularly advantageous when the partial gap is provided inside a partial area of the profile depth extending up to the trailing edge, as shown in FIG. 5a.

It can be a further advantage here when one of the above mentioned gap solutions is provided at the same main flow path boundary according to FIGS. 5a, 6a both on the front member blade row (i) and on the rear member blade row (i+1).

Furthermore, an improved operating behaviour of the blade row group can be achieved when one of the above mentioned types of a blade/gap configuration is provided at both blade ends of at least one of the member blade rows.

Furthermore, it can have an advantageous effect when the same type of a blade/gap configuration is provided at both blade ends of at least one of the member blade rows.

For a detailed consideration of the partial gap geometry in accordance with the present invention, FIG. 5a shows a section A-A, using which the blade arrangement is described in the following. The section A-A extends along a meridional flow line at an infinitesimally small distance from the main flow path boundary, so that it passes through an existing gap along the main flow path boundary over its full extent, and the end face of a blade created by the gap is visible when the section A-A is viewed in the direction of the main flow path center.

FIG. 5b shows a meridional flow line blade section in the view A-A from FIG. 5a as well as the definition of various relevant quantities in the plane established by the meridional direction m and the circumferential coordinate u. For simplicity's sake, only one blade each of the member blade rows (i) and (i+1) is shown. The case shown here as an example provides that the leading edge of the rear blade profile (i+1) is arranged in the vicinity of the pressure side and the trailing edge of the front blade profile (i). The illustration shows a particularly effective arrangement with a partial gap extending up to the trailing edge on both member blade rows. Each blade profile is shown hatched where no gap is present, corresponding to a sectional surface, and the hatched surface is referred to in the following as the profile section face. The blade profile of the member blade rows (i) and (i+1) is shown unhatched where a gap is present, corresponding to a viewed surface, and the unhatched surface is referred to in the following as the profile end face. Said profile section face is separated from said profile end face by the front limit line lgv.

The position and form of the front limit line lgv substantially determine the extent of the partial gap and are thus important in accordance with the invention.

The blade profile of the member blade rows (i) and (i+1) is shown with its substantially convex suction side, its substantially concave pressure side, and its skeleton line SKL defined in the middle between the suction side and the pressure side. For the front blade profile of the member blade row (i), the associated profile chord Se(i) results as a pressure-side tangent on the profile (i). In an equivalent manner, the profile chord Se(i+1) of the rear blade profile results as a pressure-side tangent on the profile (i+1).

A smaller flow duct is formed, here referred to as secondary passage, between the suction side of a blade in row (i+1) and the pressure side of a blade in row (i).

The profile depth of the front blade profile l(i) and the profile depth of the rear blade profile l(i+1) are measured in the direction of the respective profile chord Se(i) or Se(i+1), from the respective leading edge to the respective trailing edge.

The partial gap depth cv(i) of the front blade profile and the partial gap depth cv(i+1) of the rear blade profile are also measured in the direction of the respective profile chord Se(i) or Se(i+1), actually from the respective trailing edge to the intersection point of the respective skeleton line SKL(i) or SKL(i+1) with the respective limit line lgv(i) or lgv(i+1).

The secondary passage length v is defined as the distance between the trailing edge point of the blade (i) and the leading edge point of the blade (i+1), measured in the direction of the tangent on the skeleton line at the trailing edge point of the blade (i), and is counted positively upstream.

It is advantageous when there is a secondary passage width v greater than zero between the member blade rows (i) and (i+1) at a main flow path boundary, in accordance with a relative secondary passage width of v'=v/l(i)>0.

It is furthermore advantageous when the relative secondary passage width v' assumes values of greater than 0.05. Values of 0.05<v'<0.45 can be particularly advantageous here.

It is favourable when a radial gap extending over the entire profile depth is provided in combination with one of the above values for v' at the same blade end of the member blade row (i).

It is also favourable when a partial gap positioned in the center area of the profile depth is provided in combination with one of the above values for v' at the same blade end of the member blade row (i).

It is also favourable when a gap positioned inside a partial area of the profile depth extending up to the trailing edge is provided in combination with one of the above values for v' at the same blade end of the member blade row (i).

It can be advantageous here when the following applies for the partial gap depth cv(i) of the front blade profile:

$$0.05<cv(i)/l(i)<0.75$$

It is a further advantage when the partial gap depth cv(i) of the front blade profile is set at a selected ratio to the secondary passage length v and to the profile depth of the front blade profile l(i), in accordance with the rule:

$$(v+0.3*l(i))/l(i)-0.3<cv(i)/l(i)<(v+0.3*l(i))/l(i)+0.3$$

Further advantages result in accordance with the invention when the partial gap depth cv(i) is within even tighter limits, in accordance with:

$$(v+0.3*l(i))/l(i)-0.15<cv(i)/l(i)<(v+0.3*l(i))/l(i)+0.15$$

Figure 7:
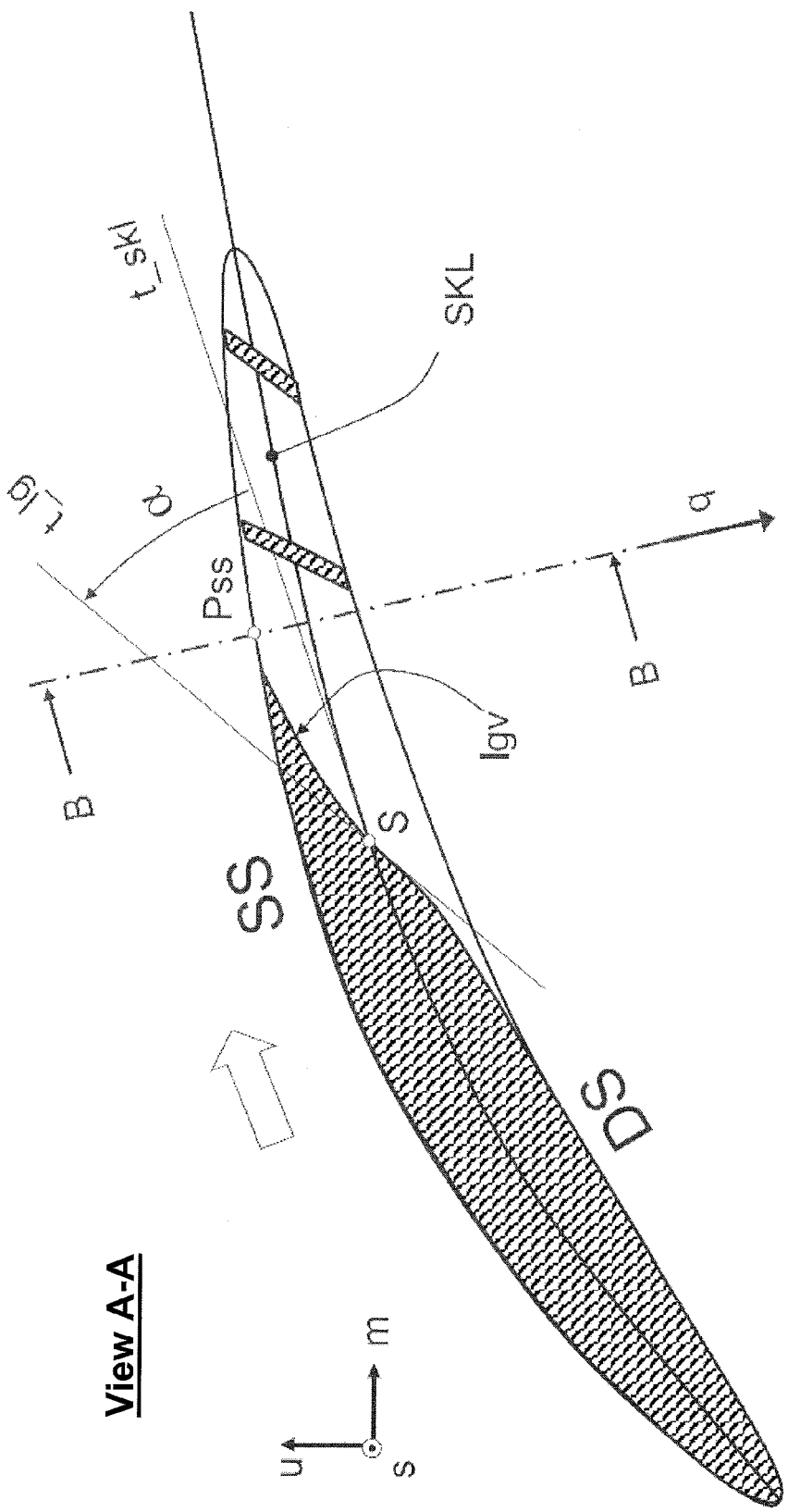

It is favourable in terms of flow when the front limit line is provided inclined relative to the skeleton line, corresponding to an obtuse inclination angle alpha<90° (see also FIG. 7).

It is advantageous when the limit line lgv(i) or lgv(i+1) on at least one of the member blade rows appertaining to the blade group extends substantially or exactly in the circumferential direction u. It is particularly favourable to provide this solution on the front member blade row (i).

Figure 6B:
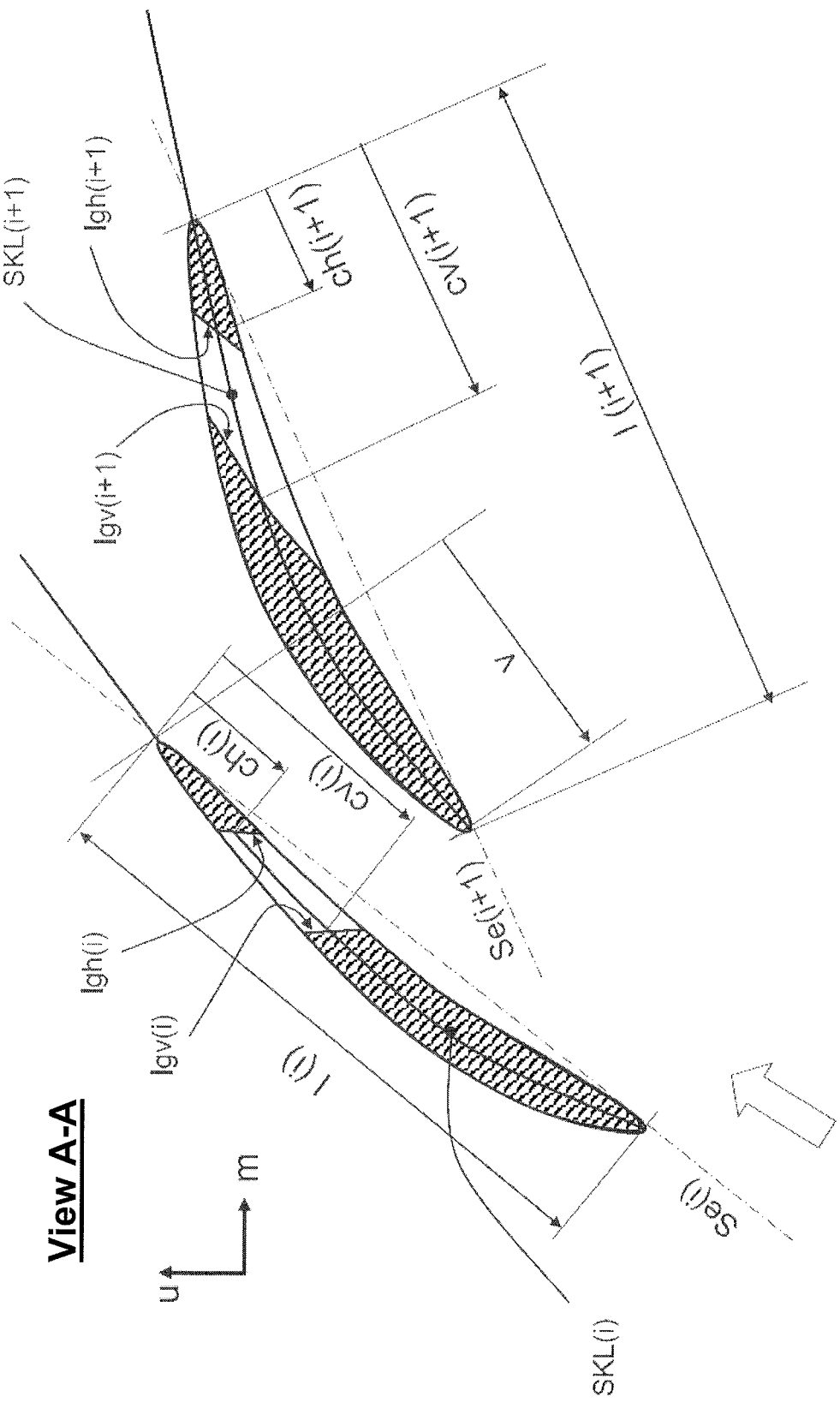
FIG. 6b shows definitions in accordance with the present invention on an edge-near blade flow line section in view A-A from FIG. 5a FIG. 7 shows definitions in accordance with the present invention of the limit line between profile section face and profile end face.

FIG. 6b shows a meridional flow line blade section in the view A-A from FIG. 6a as well as the definition of various quantities relevant for the present invention in the plane established by the meridional direction m and the circumferential coordinate u, similarly to FIG. 5a. The illustration shows a favourable arrangement in accordance with the present invention with a partial gap arranged in the center area of the profile depth and provided on both member blade rows. Each blade profile is shown hatched where no gap is present, corresponding to a sectional surface, and the hatched surface is referred to in the following as the profile section face. The blade profile of the member blade rows (i) and (i+1) is shown unhatched where a gap is present, corresponding to a viewed surface, and the unhatched surface is referred to in the following as the profile end face. Said profile section face is interrupted by the profile end face, delimited by the front limit line lgv and by the rear limit line lgh.

The position and form of the limit lines substantially determine the extent of the partial gap and are thus important in accordance with the invention.

The depth of indent ch(i) of the front blade profile and the depth of indent ch(i+1) of the rear blade profile are also measured in the direction of the respective profile chord Se(i) or Se(i+1), from the respective trailing edge to the intersection point of the respective skeleton line SKL(i) or SKL(i+1) with the respective limit line lgh(i) or lgh(i+1).

It is advantageous when a partial gap positioned in the center area of the profile depth is provided in combination with one of the above values for v' at the same blade end of the member blade row (i).

It is particularly advantageous here when for the depth of indent ch of at least one of the blade profiles the following applies:

$$0.15 < (cv - ch)/l < 0.55$$

It is particularly advantageous here when for the depth of indent ch(i) of the front blade profile the following applies:

$$0.15 < (cv(i) - ch(i))/l(i) < 0.55$$

Finally, it can be advantageous to provide, in the area between the front limit line lgv and the trailing edge, at least one flow profile-like, web-like or lamella-like break having a local connection to the main flow path boundary and further dividing the partial gap, see FIG. 7. This applies both for the described variant in accordance with the invention with partial gap in the center profile area and for the variant with partial gap adjoining the trailing edge.

FIG. 7 shows further details regarding the form of the front limit line lgv, in this case having general validity without stipulating a particular member blade row. A blade profile is shown in the view A-A from FIG. 5a; the following stipulations however also apply for arrangements similar to the view A-A from FIG. 6a.

The blade profile has a skeleton line SKL, extending in the middle between the profile pressure side and the profile suction side. Also discernable is the limit line lgv between the profile section face and the profile end face. The skeleton line SKL and the limit line lgv intersect at point S.

The tangent lying at point S on the skeleton line SKL is also shown and identified with t_skl. The tangent lying at point S on the limit line lgv is also shown and identified with t_lgv. The angle of inclination alpha measured from the tangent t_skl in the mathematically positive sense of rotation to the tangent t_lgv is a dimension for the alignment of the front limit line relative to the main flow direction; low values of alpha describe minor divergences of the limit line from the main flow direction.

It is therefore advantageous to provide values for the angle of inclination of 20°<alpha<70°. A value range for the angle of inclination of 35°<alpha<55° can also have an advantageous effect.

It is also advantageous to design the limit line lgv convex on at least part of its course between its point on the profile pressure side and the point S relative to the profile end face, in order to obtain a transition which is favourable in terms of flow between the profile pressure side and the limit line.

It is particularly advantageous to design the limit line convex on its entire course between its point on the profile pressure side and the point S relative to the profile end face.

It can furthermore be advantageous when the limit line lgv develops substantially or exactly tangentially from the pressure side.

Furthermore, a section B-B is shown which is arranged perpendicular to the plane established by the meridional coordinate m and the circumferential coordinate u (in the direction of the coordinate s) and also perpendicular to the profile skeleton line SKL (in the direction of the coordinate q). The section B-B can be viewed at any point of the skeleton line, where the quantities defined in section B-B along the skeleton line or along one of the profile sides (SS, DS) can vary. The suction side point of the profile in plane B-B is identified with Pss.

Figure 8:
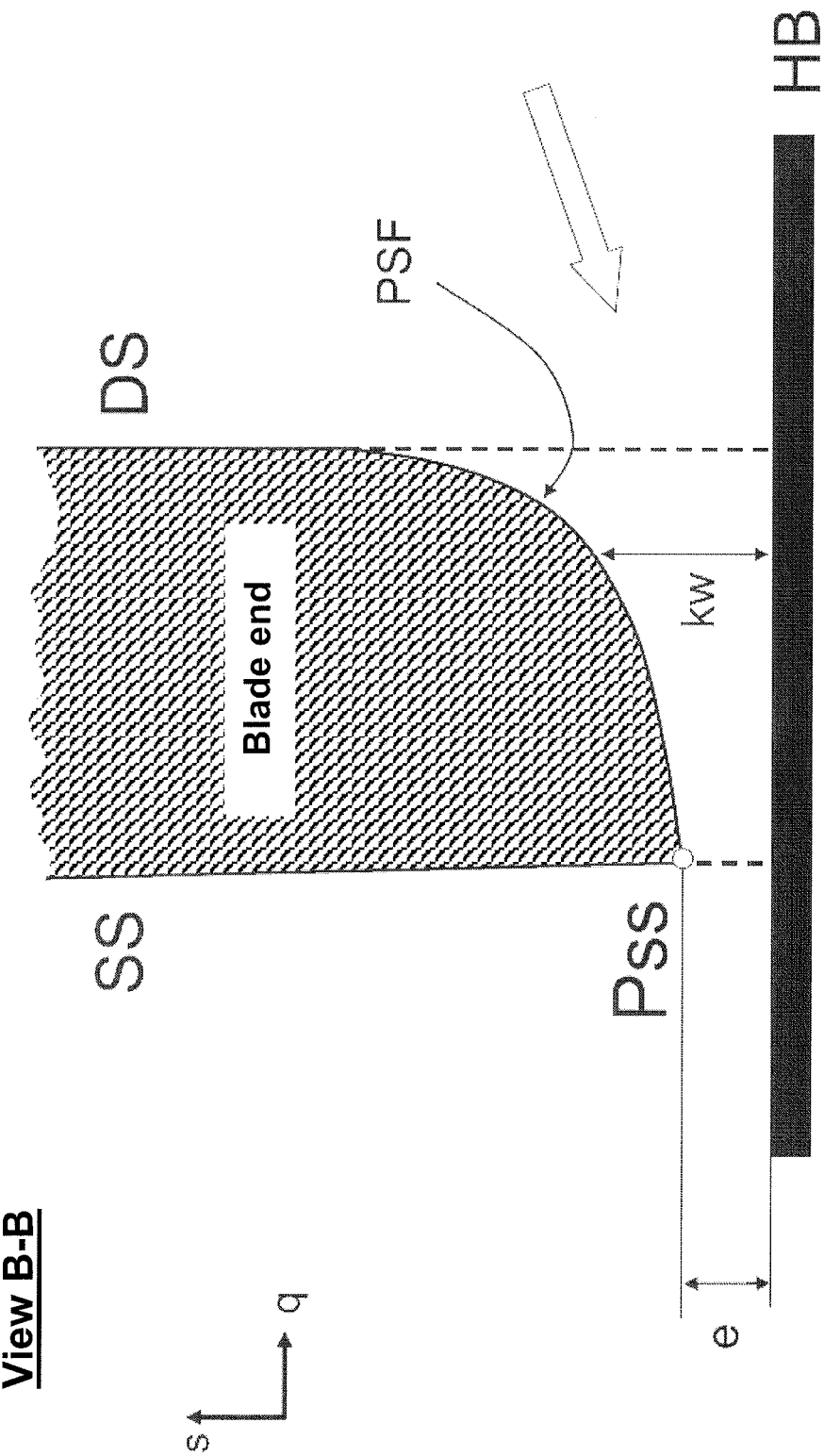
FIG. 8 shows a definition of the gap parameters in accordance with the present invention.

FIG. 8 shows the blade end of a member blade row of the blade row group in the section B-B shown in FIG. 7, as the plane established by the coordinates s and q. The fixing of the section B-B to the s-q plane is only an example, selected here to provide a clear illustration. The following description applies equally for other and possibly also curved sections through the blade profile, to the extent that the selected section is oriented perpendicular to the m-u plane.

The main flow path boundary is identified with HB. The effective gap width e is measured in accordance with the invention in the direction of the coordinate s between the suction side point Pss and the main flow path boundary HB. The effective gap width e substantially determines the quantity of the fluid flowing locally through the gap from the pressure side to the suction side, such that the course of the effective gap width e along the profile can be used to influence the flow.

It can be favourable when the course of the effective gap width e along the profile depth in the direction of the profile trailing edge is substantially or exactly constant. It can also be an advantage when the effective gap width e varies in at least one partial area of the profile depth in the direction of the profile trailing edge.

It can be advantageous here when the effective gap width e increases in at least one partial area of the profile depth in the direction of the profile trailing edge. It can furthermore be advantageous when the effective gap width e increases continuously along the profile depth in the direction of the profile trailing edge.

Due to the gap, a flow duct results between the profile end face PSF and the main flow path boundary HB. It can be advantageous when in section B-B the profile end face is designed convex at least in the transitional area towards the profile pressure side (towards the flow field) to permit a good flow guidance, as shown in FIG. 8.

The duct width kw is measured between the profile end face PSF and the main flow path boundary HB perpendicular to said main flow path boundary. It can be advantageous when the duct width kw decreases in the direction of the profile suction side SS in at least a part of the duct.

It can furthermore be advantageous when the local duct width kw always remains greater than or equal to the effective gap width e.

It can furthermore be advantageous when the local duct width kw decreases continuously (and degressively if applicable) from the pressure side DS to the suction side SS.

The present invention, in its design, is not limited to the above exemplary embodiments, which are only to be understood as examples. For instance, the gap provided in accordance with the present invention can be designed in a different way and in a different form than shown.

What is claimed is:

1. A blade row group for a main flow path of a fluid-flow machine comprising:

N adjacent member blade rows firmly arranged relative to one another in both a meridional direction and a circumferential direction, with a quantity N of the N adjacent member blade rows being greater than or equal to 2 and (i) designating a running index with values between 1 and N, with a front member blade row (i) as well as a rear member blade row (i+1) being provided, the blade row group having two main flow path boundaries, a gap provided between a blade end of at least one blade of at least one of the member blade rows and at least one of the two main flow path boundaries, where the at least one blade and the at least one of the two main flow path boundaries are immovable relative to one another in the circumferential direction, and where the gap extends along at least part of a profile depth of the at least one blade along the at least one of the two main flow path boundaries;

wherein the gap comprises a partial rear gap at at least one of the two main flow path boundaries of blades of the rear member blade row (i+1), the partial gap starting aft of leading edges of the blades of the rear member blade row and extending to the trailing edges of the blades of the rear member blade row (i+1).

2. The blade row group in accordance with claim 1, wherein the gap includes a front gap positioned at blade ends of blades of the front member blade row (i) and extending over an entire profile depth of the blades of the front member blade row (i).

3. The blade row group in accordance with claim 1, wherein the gap includes a partial front gap positioned at blade ends of blades of the front member blade row (i) and extending over a partial section of a profile depth of the blades of the front member blade row (i).

4. The blade row group in accordance with claim 3, wherein the partial front gap is provided inside a center profile area and does not touch any of leading edges and trailing edges of the blades of the front member blade row (i).

5. The blade row group in accordance with claim 3, wherein the partial front gap is provided inside a partial area of the profile depth extending up to trailing edges of the blades of the front member blade row (i).

6. The blade row group in accordance with claim 1, wherein the gap includes a front partial gap on both blade ends of blades of the front member blade row (i), the front partial gap extending over a partial section of a profile depth of the blades of the front member blade row (i).

7. The blade row group in accordance with claim 1, wherein the gap includes on the front member blade row (i), a front gap or partial front gap at the at least one of the two main flow path boundaries and, when viewing the blade row group at the at least one of the two main flow path boundaries in a meridional flow line section (u-m plane) extending at an infinitesimally small distance from the at least one of the two main flow path boundaries, the leading edges of the blades of the rear member blade row (i+1) are arranged in a vicinity of pressure sides and trailing edges of blades of the front member blade row (i).

8. The blade row group in accordance with claim 7, and further comprising a secondary passage formed between pressures sides of blades of the front member blade row (i) and suction sides of the blades of the rear member blade row (i+1), where a length v of the secondary passage is defined as a distance between trailing edge points of blades of the front member blade row (i) and leading edges points of the blades of the rear member blade row (i+1) in a direction of a tangent on a skeleton line at the trailing edge points, and is measured positively upstream, where the secondary passage length v, relative to a chord length l(i) of the front member blade row (i) has values greater than zero, in accordance with v/l(i)>0.

9. The blade row group in accordance with claim 1, wherein when viewing the blade row group in a meridional flow line section (u-m plane) extending at an infinitesimally small distance from the at least one of the two main flow path boundaries, in an area without a gap in a profile section face and in an area with a gap in a profile end face, a profile section face is separated from a profile end face by a front limit line lgv, a skeleton line SKL is defined in each blade profile in a middle between a suction side and a pressure side, a profile chord Se is defined as a respective pressure-side tangent on each blade profile, a profile depth l is measured in a direction of the profile chord Se from a respective leading edge to a respective trailing edge, a respective partial gap depth cv is measured in a direction of the profile chord Se from the respective trailing edge to an intersection point of the respective skeleton line SKL with the front limit line lgv, and the partial gap depth cv is defined in accordance with 0.05<cv/l<0.75.

10. The blade row group in accordance with claim 1, wherein the gap includes a partial front gap on blades of the front member blade row (i), and a depth cv(i) of the partial front gap is set at a selected ratio to a secondary passage length v and to a profile depth l(i) of the front member blade row (i), in accordance with a rule:

$$(v+0.3*l(i))/l(i)-0.3<cv(i)/l(i)<(v+0.3*l(i))/l(i)+0.3.$$

11. The blade row group in accordance with claim 1, wherein the gap includes a partial front gap on blades of the front member blade row (i) and, in an area between a front limit line lgv and trailing edges of the blades of the front member blade row (i), at least one gap break, the gap break having a local connection to the at least one of the two main flow path boundaries dividing the partial front gap.

12. The blade row group in accordance with claim 1, wherein a limit line for the partial rear gap, on at least part of a course of the limit line between a point on a profile pressure side and a point S relative to a profile end face is convex, to obtain a transition which is favorable for flow between the profile pressure side and the limit line.

13. The blade row group in accordance with claim 1, and further comprising, in an area of the partial rear gap, a flat or curved section through a blade profile of the rear member blade row (i+1), where the flat or curved section is oriented perpendicular to a u-m plane extending at an infinitesimally small distance from the at least one of the two main flow path boundaries and passing through the partial rear gap, where, in the flat or curved section due to the partial rear gap, a flow duct results between a profile end face and the at least one of the two main flow path boundaries, where the profile end face is convex at least in a transitional area towards a profile pressure side.

14. The blade row group in accordance with claim 1, and further comprising, in an area of the partial rear gap, a flat or curved section B-B through a blade profile of the rear member blade row (i+1), where the flat or curved section is oriented perpendicular to a u-m plane extending at an infinitesimally small distance from the at least one of the two main flow path boundaries and passing through the partial rear gap, where, in the flat or curved section due to the partial rear gap, a flow duct results between a profile end face and the at least one of the two main flow path boundaries, where a flow duct width kw is measured between the profile end face and the at least one of the two main flow path boundaries perpendicular to the at least one of the two main flow path boundaries, where the flow duct width kw decreases in a direction of a profile suction side in at least a part of the flow duct.

15. The blade row group in accordance with claim 1, wherein the partial rear gap is positioned at both of the two main flow path boundaries of the rear member blade row.

16. A blade row group for a main flow path of a fluid-flow machine comprising:
   N adjacent member blade rows firmly arranged relative to one another in both a meridional direction and a circumferential direction, with a quantity N of the N adjacent member blade rows being greater than or equal to 2 and (i) designating a running index with values between 1 and N, with a front member blade row (i) as well as a rear member blade row (i+1) being provided, the blade row group having two main flow path boundaries,
   a gap provided between a blade end of at least one blade of at least one of the member blade rows and at least one of the two main flow path boundaries, where the at least one blade and the at least one of the two main flow path boundaries are immovable relative to one another in the circumferential direction, and where the gap extends at least part of a profile depth of the at least one blade along the at least one of the two main flow path boundaries;
   wherein the gap comprises a partial gap on at least one of the member blade rows (i) or (i+1), and
   when viewing the blade row group in a meridional flow line section (u-m plane) extending at an infinitesimally small distance from the at least one of the two main flow path boundaries, in an area without a gap in a profile section face and in an area with a gap in a profile end face, a profile section face is separated from a profile end face by a front limit line lgv, a skeleton line SKL is defined in each blade profile in a middle between a suction side and a pressure side, a profile chord Se is defined as a respective pressure-side tangent on each blade profile, a profile depth l is measured in a direction of the profile chord Se from a respective leading edge to a respective trailing edge, a respective partial gap depth cv is measured in a direction of the profile chord Se from the respective trailing edge to an intersection point of the respective skeleton line SKL with the front limit line lgv, and the partial gap depth cv is defined in accordance with $0.05 < cv/l < 0.75$.

17. A blade row group for a main flow path of a fluid-flow machine comprising:
   N adjacent member blade rows firmly arranged relative to one another in both a meridional direction and a circumferential direction, with a quantity N of the N adjacent member blade rows being greater than or equal to 2 and (i) designating a running index with values between 1 and N, with a front member blade row (i) as well as a rear member blade row (i+1) being provided, the blade row group having two main flow path boundaries,
   a gap provided between a blade end of at least one blade of at least one of the member blade rows and at least one of the two main flow path boundaries, where the at least one blade and the at least one of the two main flow path boundaries are immovable relative to one another in the circumferential direction, and where the gap extends along at least part of a profile depth of the at least one blade along the at least one of the two main flow path boundaries;
   wherein the gap comprises a partial front gap on blades of the front member blade row (i), and a depth cv(i) of the partial front gap is set at a selected ratio to a secondary passage length v and to a profile depth l(i) of the front member blade row (i), in accordance with a rule:

$$(v+0.3*l(i))/l(i)-0.3 < cv(i)/l(i) < (v+0.3*l(i))/l(i)+0.3.$$

\* \* \* \* \*